UNITED STATES PATENT OFFICE.

HEINRICH TRILLICH, OF MUNICH, GERMANY, ASSIGNOR TO THE KATH-REINER'S MALZKAFFEE FABRIKEN MIT BESCHRAENKTER HAFTUNG, OF SAME PLACE.

ART OF PREPARING SUBSTITUTES FOR COFFEE.

SPECIFICATION forming part of Letters Patent No. 513,252, dated January 23, 1894.

Application filed December 22, 1893. Serial No. 494,489. (No specimens.) Patented in England November 1, 1891, No. 14,755; in Germany March 8, 1892, No. 65,300; in Belgium April 28, 1892, No. 99,372; in France April 30, 1892, No. 221,293; in Norway June 3, 1892, No. 2,821; in Sweden June 4, 1892, No. 4,272, and in Spain July 14, 1892, Nos. 13,375 and 2,582.

*To all whom it may concern:*

Be it known that I, HEINRICH TRILLICH, a subject of the German Emperor, residing at Munich, Bavaria, in the German Empire, have invented certain new and useful Improvements in the Art of Preparing Substitutes for Coffee, (for which I have obtained patents in Germany, No. 65,300, dated March 8, 1892; in France, No. 221,293, dated April 30, 1892; in Belgium, No. 99,372, dated April 28, 1892; in England, No. 14,755, dated November 1, 1891; in Spain, Nos. 13,375 and 2,582, dated July 14, 1892; in Sweden, No. 4,272, dated June 4, 1892, and in Norway, No. 2,821, dated June 3, 1892;) and I do hereby declare the following to be a full, clear, and exact description of the invention, such as will enable others skilled in the art to which it appertains to make and use the same.

This invention relates to the utilization of the parts of the coffee-plant, including the waste-products, arising in the gathering of the coffee-bean, for the purpose of preparing a food compound which contains the essential principles for which the beverage known as "coffee" is valued.

It is one of the objects of my invention to utilize the waste-materials arising in the gathering and preparing of the coffee-bean, for the usual purposes. In these industries, a number of waste-products are thrown off which heretofore were useless and were generally thrown aside. Among these waste-products are the pulp or pericarp of the fruit, in which the coffee-beans are incased, and also the leaves, the bark, and other parts of the coffee-plant, all of which contain the principles for which the consumption of coffee is resorted to, these principles existing either in a developed or an undeveloped condition, in which latter case they are developed in the manner hereinafter to be set forth.

It is a further object of my invention to impregnate suitable solid bases, such as grain, malted or not malted, with the above-mentioned principles from the coffee-plant, in such a way that a wholesome and nourishing beverage may be prepared therefrom, which, at the same time, partakes of the cheering, stimulating and restorative properties of coffee. It should be observed, moreover, that I may also impregnate the coffee-beans themselves with these principles from the coffee-plant, thus enhancing their strength and improving their quality in many cases. By far the most important object of the present invention, however, is to impregnate suitable solid bases, such as grain, malted or not malted, with the aromatic substances or volatile oils of the coffee-bean, usually known as "caffeone," without subjecting the latter to a two-fold roasting process, which, as numerous experiments have shown, results in a partial or even a complete destruction of such volatile oils, according to the point to which the second roasting process has been carried. In the processes heretofore carried out for impregnating the solid base, such as grain, &c., with the caffeone, the said grain, &c., has been impregnated either with a decoction of roasted coffee, and then roasted, or with the condensed vapors arising when coffee is roasted, and containing the volatile oils, and thereupon roasted. Under both methods, it will be seen, the said volatile oils are subjected to a double roasting process, the last roasting resulting in a destructive effect upon the caffeone.

It has been my object to avoid one of these roasting steps and the consequent destructive effects, and I have been enabled to carry out this object by the discovery which I have made, with regard to the properties of an extract made from the raw products or parts of the coffee-plant, and which is, that when a solid base, such as grain of any kind, malted or not malted, is impregnated with such extract and then roasted, the volatile oils of the coffee-bean, known as "caffeone," are developed.

Based on this discovery, among other things, my invention consists in the matter hereinafter to be described and pointed out in the claims. I take raw coffee-beans or the raw waste-products, arising in the gathering of the coffee-bean, such as the shells or pericarp of the coffee-berry, the leaves, twigs, or the bark of the coffee-plant (any, or all of them) in a green or preliminarily dried condition, and prepare an extract from the same, by soaking them in hot water. I thereupon impregnate a solid base, such, as, for example, grain of any kind, malted or not malted, with such raw extract and then roast the base so impregnated, in a well-known manner. By this roasting, the grain or other base is not only brought into a suitable condition for use, but, most important of all, the volatile aromatic oils, known as "caffeone," are developed in the grain or other base, in addition to the caffein which always exists in the extract before the roasting process.

It will be seen that, by my invention, I am not only enabled to obtain the caffeone from a source independent of the coffee-bean, namely, from what were formerly waste-products, but such caffeone is not subjected to a double, and, hence, injurious roasting process, as heretofore.

The advantages and economy, and beneficial results, arising from this invention, are obvious.

Other methods for obtaining the extract from the raw parts of the coffee-plant may be employed, and the relative amounts of caffein and caffeone, contained in such extracts, depend on the particular method chosen. In all of them, the principle of the invention is the same, however, viz: the development of the caffeone from the extract by roasting. The raw coffee-bean might be employed for the same purpose, but this would result in no economy over the usual method of developing the caffeone therein by roasting the bean directly. The grain, &c., treated in the above manner, may be coated, to preserve the same against deterioration in any of the usual and known ways.

The above manner of treating the cereal base impregnated with the extract from the coffee-plant with the caffeone or aromatic oils of coffee,—viz: by roasting the same and thereby developing said caffeone,—I consider the preferable manner of carrying out my invention, and the most important feature thereof; but, in some cases, such treatment may comprise a further addition of the aromatic oils obtained in other ways, by intermittently spraying the impregnated base, after the first part of the roasting step, with a solution containing the aromatic oils from coffee, during the roasting process, in the manner set forth in my Patent No. 488,801, dated December 27, 1892. The apparatus set forth in that patent, or any other suitable apparatus may be employed for that purpose. The solution containing the aromatic principle or caffeone may preferably be in the form of a sugar sirup or caramel solution, the spraying being carried out by passing a jet of steam or air through the solution to carry with it the said solution. The aromatic oils for this purpose are obtained from coffee in the process of roasting, by conducting the vapors arising during the roasting process into a suitable condenser, where the condensed or liquefied vapors containing the aromatic oils or caffeone are collected. These condensed vapors react somewhat acid, and are, therefore, neutralized with an alkaline substance, such as carbonate of magnesium or calcium, and then redistilled and the purified aromatic oils so obtained may be employed in the aforesaid spraying operation.

When employing a saccharine solution containing the aromatic oils of caffeone, the grains of the cereal or malt, or other substance serving as a base, are each covered with a saccharine coating which serves to retain the aromatic oils or caffeone and other principles of the coffee-plant with which the base has been impregnated and to prevent their escape until the beverage is prepared. Although the last mentioned step of additionally treating the cereal or other base with the caffeone from a source outside of the extract from the raw products of the coffee-plant may be desirable in some cases, it is not absolutely necessary and the supply of this principle derived directly from the extract by roasting the base impregnated with said extract is ordinarily sufficient, and it is this method of obtaining the caffeone which I consider the most important part of my invention.

What I claim, and desire to secure by Letters Patent, is—

1. The process which consists in preparing an extract from the raw waste products of the coffee plant, then impregnating a cereal base with such extract and finally treating the same with the aromatic oils of coffee or caffeone, substantially as set forth.

2. The process which consists in impregnating a solid base with an extract from the raw products of the coffee plant and then roasting the base so impregnated, whereby the volatile oils of coffee are developed in such base, substantially as set forth.

3. The process which consists in making an extract from the raw waste products of the coffee plant, impregnating a solid base with the same and then roasting the base so impregnated, substantially as set forth.

4. The process which consists in making an extract from the raw waste products of the coffee plant, impregnating grain with the extract so produced and then roasting the grain so impregnated, whereby the volatile oils of the coffee are developed in such base, substantially as set forth.

5. The process which consists in impregnating grain with an extract containing caffein, then roasting the same, and then continuing the roasting and intermittently spraying the same with a solution containing the aromatic oils of coffee, substantially as set forth.

6. The process which consists in impregnating malt with an extract from the waste products of the coffee plant, then roasting the same, and then continuing the roasting while intermittently spraying the same with a sugar solution containing the aromatic oils of coffee, substantially as set forth.

In testimony whereof I affix my signature in presence of two witnesses.

HEINRICH TRILLICH.

Witnesses:
   ALBERT WEICKMAN,
   CARL MAYER.